May 24, 1960      R. W. KELLY      2,937,440

TUBE CUTTER

Filed Sept. 5, 1958

INVENTOR.
ROBERT W. KELLY
BY
Laurence M. Goodridge
ATTORNEY

United States Patent Office 2,937,440
Patented May 24, 1960

2,937,440

TUBE CUTTER

Robert W. Kelly, Maryland Heights, Mo., assignor to ACF Industries, Incorporated, New York, N.Y., a corporation of New Jersey Filed Sept. 5, 1958, Ser. No. 759,213

5 Claims. (Cl. 30—95)

This invention relates to tube cutters, and more specifically to a separable type of tube cutter capable of assembly with a tube already connected at its ends. This tube cutter is intended for automotive use, although not so limited, and is accordingly constructed for manual manipulation in the restricted spaces about the automotive chassis and engine in which fuel and oil lines are generally located.

One of the objects of this invention is a tube cutter of the type which can be easily assembled about a tube.

Another object of this invention is a tube cutter of minimum outside dimensions to make it adaptable to operation in close quarters such as exist, for example, around automotive engines.

Another object of this invention is a tube cutter which is so constructed that some gripping surfaces are accessible to provide for manual operation even in confined spaces.

Further objects and advantages of the present construction will become more readily apparent from a reading of the following detailed description taken with the accompanying drawings, in which.

The following detailed description includes two forms of the invention which embody constructions now regarded by applicant as the best mode of carrying the invention into practice.

Figure 1:
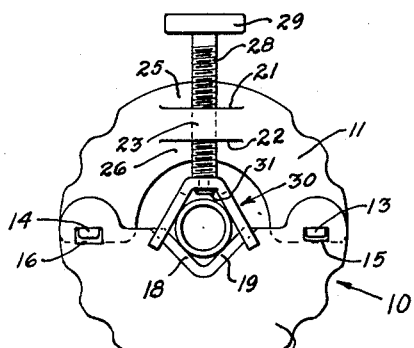
Fig. 1 is a front view of a cutter constructed in accordance with this invention and illustrated in assembled condition about a tube to be cut.
Figure 2:
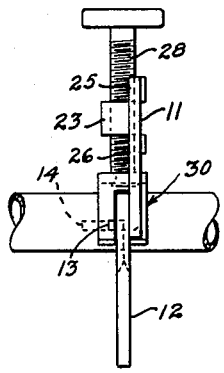
Fig. 2 is an end view of the same cutter as shown in Fig. 1.
Figure 4:
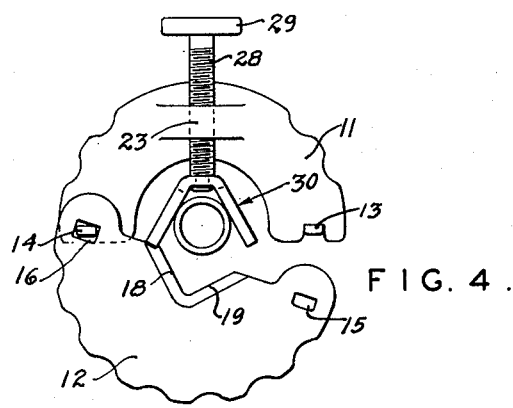
Fig. 4 is a front view of the same cutter as shown in Fig. 1 indicating the manner of dissassembly or assembly.

With reference to Fig. 1, the tube cutter 10 comprises a structure formed by two yoke members 11 and 12. As shown, these yoke members are approximately semi-circular in form, and this is the preferred manner of construction. Each yoke member 11 and 12 has means for detachably securing it to the other yoke member, and, in this instance, the securing means is a separable fastener at the end of each yoke, such as, for example, the lugs 13 and 14 at the ends of yoke 11 and the apertures 15 and 16 at the ends of yoke 12. The lugs 13 and 14 are adapted to be received within the apertures 15 and 16, and are located on the ends of the respective yoke members 11 and 12, so that the corresponding ends of the yoke members are retained in overlapping relation, all for a purpose which will hereinafter appear.

Yoke member 12 has a pair of angularly related cutting edges such as 18 and 19. Yoke member 11 also includes a mechanism for applying pressure to the outside of the tube for forcing it against the cutting edges 18 and 19. Preferably this structure is formed in a simple and economical manner by slitting the metal of the yoke 11 at spaced, parallel locations such as 21 and 22, and then deforming the strip of metal bounded by the slits 21 and 22 into a loop 23. The inner surface of the loop 23 is spaced a sufficient distance from the surfaces 25, 26 above and below the loop 23 to receive a screw 28 with a knurled thumbpiece 29. The end of the self-tapping screw 28 is secured to a workholder 30 by heading over a reduced portion 31 on the end of the screw 28.

Figure 3:
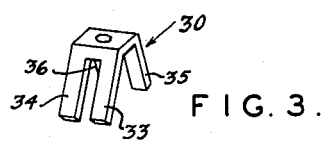
Fig. 3 is a view in perspective of a pressure member for the cutter shown in Fig. 1 for forcing the tube into the cutter.

Workholder 30 is shown more in detail in Fig. 3, and comprises, essentially, angularly related surfaces for engaging the outside of the tube to be cut, which surfaces are, in turn, formed by a plurality of spaced legs such as 33, 34 and 35, 36. The space between the legs 33, 34 and the space between the legs 35, 36 straddle the yoke member 12.

Operation

In operation, the tube cutter is placed about the tube to be cut by retracting the screw 28 by rotation of the knob 29. This allows disengagement of the lugs 13 and 14 from the apertures 15 and 16. The lugs 13 and 14 can obviously not be withdrawn until the workholder 30 is raised by the screw, since the legs of the workholder which straddle the yoke prevent separation of the tube cutter. The yoke members are purposely made so as to overlap a substantial amount, since this lends stability to the mechanism when in assembled relation about the tube, and prevents undue wobbling of one yoke with respect to the other. This feature of preventing disassembly of the yoke members by the workholder keeps the parts together after the tube has been severed, and avoids the loss of part of the tube cutter when the piece of the tube actually comes apart.

With the two yokes separated, the device is placed about the tube, lugs 13 and 14 engaged in the apertures, and workholder 30 forced downwardly into engagement with the tube by rotation of the thumbscrew 29. When assembled, the outer surface of the yoke presents a relatively circular gripping surface for manual operation, even in inaccessible places, and during the rotation the thumbscrew 29 may be tightened until cutting edges 18 and 19 separate the tube.

Modification

Figure 5:
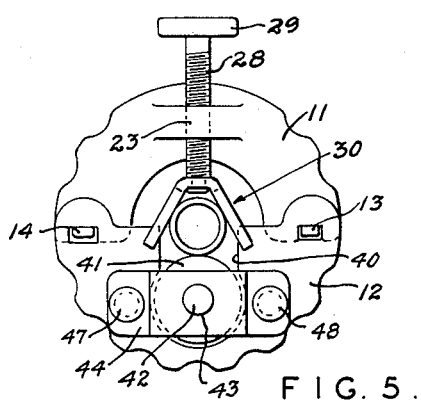
Fig. 5 is a front view of a modified form of the cutter shown in Fig. 1.
Figure 6:
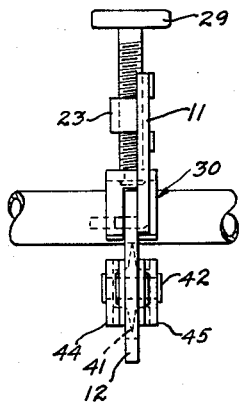
Fig. 6 is a side view of the modified form of cutter shown in Fig. 5.

The modified form shown in Fig. 5 is substantially identical with the above-described form except for the cutting edge which, in the modification of Fig. 5, is a cutter wheel instead of fixed angularly related cutting edges 18 and 19. Because the two forms are substantially identical, the same reference characters will be used to indicate like parts.

In the modified form, yoke 12 is slotted as at 40 to receive a cutting wheel such as 41. Cutter 41 has a pair of oppositely extending bearings such as 42 which are, in turn, supported within apertures 43 of a pair of bearing members 44 and 45 secured to opposite sides of the yoke 12 by rivets 47, 48.

Operation

Since the operation of the form shown in Fig. 5 is identical with that above described for the modification in Fig. 1, a repetition is deemed unnecessary for a full understanding of the invention.

A structure has been described which will fulfill all of the objects of the invention, but it is contemplated

I claim:

1. A separable type of tube cutter comprising a pair of yokes adapted to circumscribe the tube to be cut, means for separably fastening said yokes in assembled relation around the tube, a cutter on one of said yokes positioned to engage the external surface of the tube, and means on the other of said yokes for applying pressure to the opposite side of the tube to prevent disengagement of said means for separably fastening said yokes, said last named means comprising a workholder mechanism having angular surfaces formed by spaced legs arranged to straddle opposite sides of the other of said yokes, said yokes, when assembled, forming a generally circular outer gripping surface rotating the cutter.

2. A separable type of tube cutter comprising a pair of yokes adapted to circumscribe the tube to be cut, means for separably fastening said yokes in assembled relation around the tube, a cutter on one of said yokes positioned to engage the external surface of the tube, and means on the other of said yokes for applying pressure to the opposite side of the tube to prevent disengagement of said means for separably fastening said yokes and to force said cutter against the tube, said last named means including a workholder having spaced legs for straddling opposite sides of the first yoke and a thumb screw member on said other yoke for applying pressure to press said workholder against the outer surface of the tube, said yokes, when assembled, forming a generally circular outer gripping surface for rotating the cutter.

3. The combination as defined in claim 2 in which said cutter comprises a pair of angularly related sharpened cutter edges on one of said yokes.

4. The combination defined in claim 2 in which said cutter includes a wheel member mounted in a slot in one of said yokes, journal members on opposite sides of said cutter, and bearings secured to opposite faces of said yoke and having apertures for receiving said journals.

5. A separable type of tube cutter comprising a pair of yokes adapted to circumscribe the tube to be cut with the legs of said yokes in overlapping relation, means for separably fastening said yokes in assembled relation around the tube including interengaging lugs and apertures, respectively, on the overlapping ends of the respective yoke members, means for retaining the lugs in engagement with the apertures comprising a workholder member mounted for radial movement with respect to said yokes and having spaced legs straddling opposite sides of the other of said yokes, and cutter means on the last said yoke in opposed relation to said workholder member.

References Cited in the file of this patent

UNITED STATES PATENTS

| | | |
|---|---|---|
| 870,951 | Goodholm et al. | Nov. 12, 1907 |
| 1,811,046 | Goldhagen | June 23, 1931 |
| 2,622,323 | Grimaldi | Dec. 23, 1952 |
| 2,697,875 | McIver | Dec. 28, 1954 |